US008679270B2

(12) United States Patent
Dowe et al.

(10) Patent No.: US 8,679,270 B2
(45) Date of Patent: Mar. 25, 2014

(54) USE OF A SHAPED PART MADE OF A POLYAMIDE SHAPED COMPONENT AS AN INLINER FOR A CONDUIT

(75) Inventors: Andreas Dowe, Borken (DE); Rainer Goering, Borken (DE); Christian Baron, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/238,587

(22) Filed: Sep. 21, 2011

(65) Prior Publication Data

US 2012/0006465 A1 Jan. 12, 2012

Related U.S. Application Data

(63) Continuation of application No. 12/374,832, filed as application No. PCT/EP2007/057993 on Aug. 2, 2007, now abandoned.

(30) Foreign Application Priority Data

Aug. 14, 2006 (DE) .......................... 10 2006 038 108

(51) Int. Cl.
*B29C 73/00* (2006.01)
*B32B 43/00* (2006.01)
*B29C 47/00* (2006.01)
*B29C 65/00* (2006.01)
*B32B 37/00* (2006.01)
*F02F 1/06* (2006.01)

(52) U.S. Cl.
USPC ........ 156/94; 156/244.13; 156/294; 156/296; 156/303.1

(58) Field of Classification Search
USPC ......... 156/94, 156, 242, 244.11, 244.13, 285, 156/287, 293, 294, 296, 303.1
See application file for complete search history.

(56) References Cited

U.S. PATENT DOCUMENTS

| 2,971,538 | A | | 2/1961 | Brumbach |
| 3,561,493 | A | | 2/1971 | Maillard et al. |
| 3,974,306 | A | | 8/1976 | Inamura et al. |
| 4,368,091 | A | * | 1/1983 | Ontsuga et al. ............... 156/287 |
| 4,613,532 | A | | 9/1986 | Michel et al. |
| 5,026,582 | A | | 6/1991 | Hartitz |
| 5,284,184 | A | | 2/1994 | Noone et al. |
| 5,566,720 | A | | 10/1996 | Cheney et al. |
| 5,944,058 | A | * | 8/1999 | Kamiyama et al. ............. 138/98 |
| 6,041,826 | A | | 3/2000 | Lorek et al. |
| 6,416,692 | B1 | * | 7/2002 | Iwasaki-Higbee ......... 264/36.17 |
| 6,500,554 | B2 | | 12/2002 | Gahlmann et al. |
| 6,677,015 | B2 | | 1/2004 | Himmelmann et al. |
| 6,884,485 | B2 | | 4/2005 | Baumann et al. |
| 7,005,481 | B1 | | 2/2006 | Lehmann et al. |
| 7,025,842 | B2 | | 4/2006 | Monsheimer et al. |
| 7,582,342 | B2 | | 9/2009 | Baumann et al. |
| 8,303,873 | B2 | | 11/2012 | Dowe et al. |
| 2003/0124281 | A1 | | 7/2003 | Ries et al. |
| 2004/0140668 | A1 | | 7/2004 | Monsheimer et al. |
| 2005/0038201 | A1 | * | 2/2005 | Wursche et al. ............... 525/340 |
| 2006/0182916 | A1 | | 8/2006 | Dowe et al. |
| 2006/0183869 | A1 | | 8/2006 | Dowe et al. |
| 2006/0280889 | A1 | * | 12/2006 | Powell et al. ............... 428/36.91 |
| 2007/0036998 | A1 | | 2/2007 | Dowe et al. |
| 2008/0217821 | A1 | | 9/2008 | Goring et al. |
| 2008/0292824 | A1 | | 11/2008 | Haeger et al. |
| 2009/0202768 | A1 | | 8/2009 | Charron et al. |
| 2010/0009106 | A1 | | 1/2010 | Dowe et al. |
| 2010/0300572 | A1 | | 12/2010 | Dowe et al. |
| 2010/0300573 | A1 | | 12/2010 | Dowe et al. |
| 2011/0165358 | A1 | | 7/2011 | Dowe et al. |
| 2011/0209768 | A1 | | 9/2011 | Dowe et al. |
| 2012/0000541 | A1 | | 1/2012 | Dowe et al. |

FOREIGN PATENT DOCUMENTS

EP     1 189 970      3/2003

OTHER PUBLICATIONS

U.S. Appl. No. 13/457,634, filed Apr. 27, 2012, Goering, et al.
U.S. Appl. No. 13/463,061, filed May 3, 2012, Goering, et al.
Palmer, R.J. and Updated by Staff 2005, Polyamides, Plastics. Kirk-Othmer Encyclopedia of Chemical Technology.
U.S. Appl. No. 13/640,552, filed Oct. 11, 2012, Kuhmann, et al.
U.S. Appl. No. 13/639,765, filed Oct. 5, 2012, Kuhmann, et al.
U.S. Appl. No. 13/640,679, filed Oct. 11, 2012, Kuhmann, et al.
U.S. Appl. No. 13/640,586, filed Oct. 11, 2012, Kuhmann, et al.
U.S. Appl. No. 13/729,280, filed Dec. 28, 2012, Pawlik, et al.

* cited by examiner

*Primary Examiner* — Philip Tucker
*Assistant Examiner* — Brian R Slawski
(74) *Attorney, Agent, or Firm* — Oblon, Spivak, McClelland, Maier & Neustadt, L.L.P.

(57) ABSTRACT

A pipe or hose composed of a polyamide moulding composition whose molecular weight has been increased by condensation, via addition of a compound having at least two carbonate units in a quantitative proportion of from 0.005 to 10% by weight, based on polyamide, where
a) a starting polyamide moulding composition was provided,
b) a mixture of the starting polyamide moulding composition and of the compound having at least two carbonate units was produced,
c) the premix was, if desired, stored and/or transported, and
d) the premix was then processed to give the moulding, this step being the first in which the increase of molecular weight by condensation occurred,
the moulding being a pipe or hose whose external diameter is at least 25 mm
is used as inliner for a pipeline.

10 Claims, No Drawings

USE OF A SHAPED PART MADE OF A POLYAMIDE SHAPED COMPONENT AS AN INLINER FOR A CONDUIT

This application is a continuation of application Ser. No. 12/374,832 filed on Jan. 23, 2009, now abandoned.

The invention relates to the use of an inliner composed of a specific polyamide moulding composition for pipes or sewers (hereinafter termed "pipelines"), where the pipes or sewers serve for the transport of district heating, fresh water, waste water, gas or similar fluids.

District-heating lines, fresh-water lines, waste-water lines or gas lines, or lines or, respectively, pipes or sewers transporting other fluids have restricted operating time. Lines which have been in place for a long time are therefore often defective, thus permitting, for example, escape of waste water into the surrounding ground water or ingress of any ground water present into the waste-water pipes. The reason for this is firstly progressive corrosion damage, and secondly increasing mechanical load due to traffic vibration, or pressure or earth movements associated with civil-engineering work or in the vicinity of mining activities. The depth to which the pipes or sewers in question are buried in the ground is about 1 m or more, and therefore considerable cost would be incurred if the entire length of the pipes or sewers were to be replaced. There is therefore a need for renovation methods which can provide low-cost renovation of defective lines in supply networks and in waste-disposal networks.

In one known relining method, a long pipe section composed of plastics pipes welded together, for example composed of polyethylene, is inserted into the damaged section of the sewer. Since the pipes have little flexibility, relatively large excavations are needed for this.

In what is known as short-pipe relining, short plastics pipes whose length is from about 0.5 m to at most 1 m are assembled within existing standard sewer manholes and from this sewer manhole are inserted or drawn into the sewer section to be renovated (DE-C 34 13 294).

DE-A 27 04 438 proposes renovating sewer pipes by introducing, into the interior of the outflow pipe, a flexible polyethylene pipeline whose external diameter is smaller than the internal diameter of the outflow pipe, the flexible pipeline being arranged with separation from the outflow pipe with formation of an annular space. In this method, the annular space is filled with a hardenable filler composition of low viscosity, magnesium cement being an example of a filler composition used.

WO 93/21398 and WO 93/21399 disclose relining systems with, in each case, two inliners comprising polyethylene. The inner inliner has inversions which serve as spacers.

WO 96/06298 moreover teaches introduction, into the lines or pipes to be renovated, of an inliner having spacers and comprising polyethylene or polypropylene, and then filling of the intermediate space with a hardenable composition or with a hardening plastics material. A primer is recommended for improvement of adhesion of this plastics material to the inliner.

WO 00/40887 discloses a pipeline system with controlled sealing function and comprising an intrinsically stiff pipe impermeable to fluid and a flexible control-inliner, both comprising polyethylene, where the control-inliner also contains a permeation barrier for hydrocarbons in the form of an aluminium foil. However, production of such systems is complicated.

The polyethylene inliners predominant in the prior art have a number of disadvantages, for example, their swelling behaviour and diffusion behaviour is poor, in particular for conveying of organic liquids, such as crude oil, petrochemicals, or of waste water which contains organic liquids, e.g. solvents. Diffusion performance is also disadvantageous in the case of gas lines. Polyethylene is moreover susceptible to stress-cracking, e.g. on contact with surfactants, and is also notch-sensitive. Furthermore, in the absence of complicated pre-treatment polyethylene lacks sufficient adhesion to hardening plastics materials used for filling of the annular space. Hardening of the filling material can moreover, e.g. in case of PU resins, lead to temperature peaks leading to excessive softening of the inliner, causing sagging. Because polyethylene has a low softening point and little solvent-resistance, inliners composed of this material can be used only at operating temperatures up to at most 65° C.

Another technical solution is described by way of example in DE-C 23 62 784. It discloses a system in which a single-side plastics-coated nonwoven hose is saturated in advance with resin and hardener in such a way that, once it has been introduced by the inversion method into the pipeline to be renovated, and once it has been pressed by means of water pressure onto the pipe wall, it hardens via heating of the system and thus becomes a new line system with a stiff pipe wall. Since the resin-hardener system in the nonwoven substrate has only limited processing time (pot life), saturation, transport to the construction site (possibly in a refrigerated vehicle) and introduction have to take place within a relatively short period. This method is moreover only satisfactorily applicable if the pipes to be renovated have no relatively large cracks or holes, since the resin can escape through these prior to hardening.

For some time, trials have been carried out with inliners composed of polyamide in the offshore sector in steel pipes which convey crude oil or crude gas (J. Mason, Oil & Gas Journal, Oct. 18, 1999, pp. 76-82). However, this use is restricted to the pipes with small internal diameters. Although polyamide would be a suitable inliner material here, large-dimension pipes composed of polyamide cannot be produced with adequate quality by extrusion. Specifically, extrusion of large-dimension pipes can give various difficulties caused inter alia by gravity, after discharge from the die. Sagging of the tubular melt as it is discharged here is a visible indication of low melt viscosity. Gravity causes a shift in wall thicknesses, a possible result being irregular distribution of wall thickness in the pipe. Inadequate melt stiffness of conventional polyamides prevents production of the desired geometry, for reasons of technology, cost-effectiveness, dimensional accuracy and reliability. Low melt stiffness moreover leads to an inconsistent, unstable extrusion process, one possible sign of this being inconsistent running of the melt extrudate into the calibrator unit. This can lead to production stoppages. If, in contrast, the tubular melt has high melt stiffness after it leaves the die, its progress is markedly more stable and it becomes less susceptible to external extrusion effects.

However, the high viscosity of a polyamide moulding composition with high melt stiffness makes it difficult to extrude. This requires an extraordinarily high pressure increase in the machine; and even if this is achieved, it is impossible to produce large-dimension geometries at cost-effective extrusion speeds, since the load on the motor is very high even at relatively low throughputs.

The object of the present invention consisted in avoiding these disadvantages and providing, for pipelines, an inliner which firstly has better properties than the usual materials used, based on polyethylene or GRP, and secondly can be produced reliably and with uniform wall thickness, even at large dimensions.

This object was achieved via the use of a moulding as inliner for a pipeline, the moulding comprising a polyamide moulding composition, whose molecular weight has been increased by condensation, via addition of a compound having at least two carbonate units in a quantitative proportion of from 0.005 to 10% by weight, based on polyamide, where
a) a starting polyamide moulding composition was provided,
b) a mixture of the starting polyamide moulding composition and of the compound having at least two carbonate units was produced,
c) the premix was, if desired, stored and/or transported, and
d) the premix was then processed to give the moulding, this step being the first in which the increase of molecular weight by condensation occurred,
the moulding being a pipe or hose whose external diameter is at least 25 mm, preferably at least 60 mm and particularly preferably at least 110 mm.

Surprisingly, it has been found that when this method of addition is used during processing the result is a significant increase in melt stiffness, while the load on the motor is simultaneously low. High processing throughputs can therefore be achieved despite high melt viscosity, a result being an improvement in the cost-effectiveness of the production process.

The pipeline in question can be a transport line, a distribution line or a service line, and of either pressure-line design or of open-channel design. It serves by way of example for the transport of district heating, fresh water, waste water, gas, oils, such as crude oil, light oil or heavy oil, fuels, such as kerosene or diesel, petrochemicals, brine, lyes, or abrasive fluids or dusts, and can, for example, be a supply line or a waste-disposal line. It has preferably been laid in the ground, in tunnels or trenches, or in water, or else under certain circumstances above the ground.

For the purposes of the invention, provision of the inliner to the pipeline with the aim of lengthening operating times can take place before the pipeline leaves the factory, or during laying. In most cases, however, the inliner is subsequently introduced into the transport line for renovation of the line; the term relining is used here.

The internal diameter of the pipelines in question is generally up to 4000 mm, preferably up to 2000 mm and particularly preferably up to 1000 mm.

The invention also provides a pipeline which contains this type of inliner.

In one possible embodiment, the pipeline according to the claims is not an offshore line.

The inliner can be self-supporting; in this case it is a pipe. However, it can also be non-self-supporting; in this case it is a hose. The wall thickness is generally at least 0.5 mm, preferably at least 1 mm and particularly preferably at least 2 mm. A suitable polyamide for the purposes of the invention is based on lactams, aminocarboxylic acids, diamines and, respectively, dicarboxylic acids. It can moreover contain units having branching action, derived by way of example from tricarboxylic acids, from triamines, or from polyethyleneimine. Examples of suitable types, in each case in the form of homopolymer or of copolymer, are PA6, PA46, PA66, PA610, PA66/6, PA6/6T, PA66/6T, and also in particular PA612, PA1010, PA1012, PA1212, PA613, PA1014, PA11, PA12 or a transparent polyamide.

Polyetheramides based on lactams, on aminocarboxylic acids, on diamines, on dicarboxylic acids, and on polyetherdiamines and/or on polyetherdiols are moreover suitable.

The molecular weights $M_n$ of the starting polyamides are preferably greater than 5000, in particular greater than 8000.

Polyamides used here are those whose end groups at least to some extent take the form of amino groups. By way of example, at least 30%, at least 40%, at least 50%, at least 60%, at least 70%, at least 80% or at least 90%, of the end groups take the form of amino end groups. Production of polyamides with relatively high amino end group content using as regulator, diamines or polyamines is prior art. In the present case, production of the polyamide preferably uses an aliphatic, cycloaliphatic or araliphatic diamine having from 4 to 44 carbon atoms as regulator. Examples of suitable diamines are hexamethylenediamine, decamethylenediamine, 2,2,4- or 2,4,4-trimethylhexa-methylenediamine, dodecamethylenediamine, 1,4-diamino-cyclohexane, 1,4- or 1,3-dimethylaminocyclohexane, 4,4'-diaminodicyclohexylmethane, 4,4'-diamino-3,3'-dimethyldicyclohexylmethane, 4,4'-diaminodicyclohexyl-propane, isophoronediamine, metaxylylenediamine or paraxylylenediamine.

In another preferred embodiment, production of the polyamide uses a polyamine as regulator and simultaneously uses branching agents. Examples of these are diethylenetriamine, 1,5-diamino-3-(β-aminoethyl)pentane, tris(2-aminoethyl)amine, N,N-bis(2-aminoethyl)-N',N'-bis[2-[bis(2-aminoethyl)amino]ethyl]-1,2-ethanediamine, dendrimers, and also polyethyleneimines, in particular branched polyethyleneimines obtainable via polymerization of aziridines (Houben-Weyl, Methoden der Organischen Chemie [Methods of organic chemistry], Volume E20, pages 1482-1487, Georg Thieme Verlag Stuttgart, 1987) and which generally have the following amino group distribution:
from 25 to 46% of primary amino groups,
from 30 to 45% of secondary amino groups and
from 16 to 40% of tertiary amino groups.

The inventive process used is at least one compound having at least two carbonate units in a quantitative proportion of from 0.005 to 10% by weight, calculated as ratio to the polyamide used. This ratio is preferably in the range from 0.01 to 5.0% by weight, particularly preferably in the range from 0.05 to 3% by weight. The term "carbonate" here means esters of carbonic acid in particular with phenols or with alcohols.

The compound having at least two carbonate units can be of low molecular weight, oligomeric or polymeric. It can comprise entirely carbonate units or can also have other units. These are preferably oligo- or polyamide units, oligo- or polyester units, oligo- or polyether units, oligo- or polyetheresteramide units or oligo- or polyetheramide units. These compounds can be prepared via known oligo- or polymerization processes or via polymer-analogous reactions.

In one preferred embodiment, the compound having at least two carbonate units is a polymer carbonate, for example based on bisphenol A, or is a block copolymer which contains a polycarbonate block of this type.

Feed of the compound used as additive having at least two carbonate units in the form of a masterbatch permits more precise metering of the additive, since relatively large amounts are used. Furthermore, it has been found that use of a masterbatch achieves improved extrudate quality. The matrix material comprised by the masterbatch is preferably the polyamide whose molecular weight is also increased by condensation in the inventive process, or a polyamide compatible therewith, but under the reaction conditions incompatible polyamides can also undergo some degree of linkage to the polyamide whose molecular weight is to be increased by condensation, the result being compatibilization. The molecular weight $M_n$ of the polyamide used as matrix material in the masterbatch is preferably greater than 5000 and in particular greater than 8000. Preference is given here to those polyamides whose end groups mainly take the form of carboxylic acid groups. By way of example, at least 80%, at least 90% or at least 95%, of the end groups take the form of acid groups.

The concentration of a compound having at least two carbonate units in the masterbatch is preferably from 0.15 to 50% by weight, particularly preferably from 0.2 to 25% by weight and particularly preferably from 0.3 to 15% by weight. Production of this type of masterbatch takes place in the conventional manner known to the person skilled in the art.

WO 00/66650, expressly incorporated herein by way of reference, gives a detailed description of suitable compounds having at least two carbonate units, and also of suitable masterbatches.

An additive called Brüggolen M1251, based on this principle, for adjusting the molecular weight of polyamides, is marketed by the company Brüggemann KG. Primary applications are found in the sector of viscosity adjustment for recycled material composed of PA6 or PA66, recycled in extrusion moulding compositions. The additive Brüggolen M1251 is then a masterbatch of a low-viscosity polycarbonate, for example Lexan 141, in an acid-terminated PA6. The molecular weight increase is caused by a reaction between the polycarbonate and the amino end groups contained by the material whose molecular weight is to be increased by condensation.

WO 00/66650 demonstrates the effectiveness of the method, taking the example of an increase in the molecular weight of PA6 and PA66 by condensation, the corresponding polycondensates sometimes being used in pure form, but also sometimes comprising additives, for example glass fibres and montanate.

The invention is applicable to polyamides which by virtue of the production process contain at least 5 ppm of phosphorus in the form of an acidic compound. In this case, from 0.001 to 10% by weight, based on the polyamide, of a salt of a weak acid is added to the polyamide moulding composition prior to compounding or during compounding. DE-A 103 37 707 discloses suitable salts, and is expressly incorporated herein by way of reference.

However, the invention is equally applicable to polyamides which, by virtue of the production process, contain less than 5 ppm of phosphorus or no phosphorus at all in the form of an acidic compound. In this case, it is possible, but not necessary, to add an appropriate salt of a weak acid.

The inventive process can use the conventional additives used in the production of polyamide moulding compositions. Illustrative examples here are colorants, flame retardants, stabilizers, fillers, lubricants, mould-release agents, impact modifiers, plasticizers, crystallization accelerators, antistatic agents, processing agents, and also other polymers conventionally compounded with polyamides.

Examples of these additives are as follows:

Colorants: titanium dioxide, white lead, zinc white, lithopones, antimony white, carbon black, iron oxide black, manganese black, cobalt black, antimony black, lead chromate, minium, zinc yellow, zinc green, cadmium red, cobalt blue, Prussian blue, ultramarine, manganese violet, cadmium yellow, Schweinfurter green, molybdenum orange and molybdenum red, chrome orange and chrome red, iron oxide red, chromium oxide green, strontium yellow, molybdenum blue, chalk, ochre, umbra, green earth, burnt sienna, graphite, or soluble organic dyes.

Flame retardants: antimony trioxide, hexabromocyclododecane, tetrachloro- or tetrabromobisphenol and halogenated phosphates, borates, chloroparaffins, and also red phosphorus, and also stannates, melamine cyanurate and its condensates, such as melam, melem, melon, melamine compounds, such as melamine pyro- and polyphosphate, ammonium polyphosphate, aluminium hydroxide, calcium hydroxide, and also organophosphorus compounds which contain no halogens, for example resorcinol diphenyl phosphate or phosphonic esters.

Stabilizers: metal salts, in particular copper salts and molybdenum salts, and also copper complexes, phosphites, sterically hindered phenols, secondary amines, UV absorbers and HALS stabilizers.

Fillers: glass fibres, glass beads, ground glass fibre, kieselguhr, talc, kaolin, clay, $CaF_2$, aluminium oxides, and also carbon fibres.

Lubricants: $MoS_2$, paraffins, fatty alcohols, and also fatty acid amides.

Mould-release agents and processing aids: waxes (montanates), montanic acid waxes, montanic ester waxes, polysiloxanes, polyvinyl alcohol, $SiO_2$, calcium silicates, and also perfluoropolyethers.

Plasticizers: BBSA, POBO.

Impact modifiers: polybutadiene, EPM, EPDM, HDPE, acrylate rubber.

Antistatic agents: carbon black, carbon fibres, graphite fibrils, polyhydric alcohols, fatty acid esters, amines, amides, quaternary ammonium salts.

Other polymers: ABS, polypropylene.

These additives can be used in the conventional amounts known to the person skilled in the art.

According to the invention, the compound having at least two carbonate units is added as it stands or in a form of masterbatch only after compounding, but at the latest during processing. It is preferable that, during processing, the polyamide or, respectively, the polyamide moulding composition whose molecular weight is to be increased by condensation is mixed in the form of pellets with the pellets of the compound having at least two carbonate units or with the corresponding masterbatch. However, it is also possible to produce a mixture of pellets of the finished compounded polyamide moulding composition with the compound having at least two carbonate units or, respectively, the masterbatch, and then to transport or store the mixture and then process it. The corresponding process can naturally also use powder mixtures. A decisive factor is that the mixture is not melted until processing takes place. Thorough mixing of the melt during processing is advisable. However, in an equally effective method, the masterbatch in the form of a melt stream can be metered with the aid of an ancillary extruder into the melt of the polyamide moulding composition to be processed, and then incorporated by thorough mixing.

EP 1 690 889 A1 and EP 1 690 890 A1 in general form describe the process for production of the inliner.

The wall of the inliner can either be a single-layer wall and in this case can comprise entirely the polyamide moulding composition, or can be a multilayer wall, where the polyamide moulding composition can form the outer layer, the inner layer and/or the middle layer. The other layer or the other layers comprise(s) moulding composition based on other polymers, examples being polyethylene, polypropylene or fluoropolymers. Multilayer structures of this type can be produced according to the prior art, inter alia, via coextrusion.

As described in WO 96/06298, the inliner can be introduced together with spacers into the line, the annular space between the inliner and line wall then being filled with a hardening composition, preferably with a mortar or with a hardening plastics material. However, the inliner can, if it is a self-supporting pipe, also if desired be introduced without spacers into the line, and without filling of the annular space.

A suitable mortar constitution provides homogeneous grain size distribution and a high level of impermeability of the filler material. Particular preference is given to mortars having alkaline reaction, since these do not merely passively protect iron pipes but also protect them actively by virtue of their alkaline reaction. Suitable mortars are prior art.

Suitable hardenable plastics materials for the inventive process are those having sufficient resistance to the fluid to be transported. This in particular means that the plastics materials especially have to be water- and gastight after hardening and are not permitted to be attacked by moisture.

Particularly suitable plastics materials for the inventive process are polyurethane systems, silicate resins, acrylic systems, epoxy systems and systems based on unsaturated polyesters, all of which are capable of hardening by one or other means. An advantage of all of these systems is their low susceptibility to moisture.

Suitable polyurethane systems are based on polyurethane prepolymers having a residue of reactive isocyanate groups, these having been produced from monomeric or polymeric polyfunctional isocyanates and from polyfunctional reactants, generally polyols, polyetherols or polyesterols. For hardening, the prepolymers are reacted with polyfunctional reactants having at least two free OH, SH and/or $NH_2$ groups available for reaction with the isocyanate groups, and, if desired, with the additives which are known to the person skilled in the art from polyurethane chemistry and which promote the reaction. By way of example, mention may be made here of water, polyols, such as ethylene glycol, propylene glycol or their oligomers, polyesterols, polyetherols, polyfunctional thiols or polyamines and mixtures of these. Examples of the additives accelerating hardening are tertiary amines or metal salts. These are two-component systems.

Silicate resins have firstly a water glass component and secondly an isocyanate component. They can be formulated to be foaming resins or non-foaming resins. Their chemical stability exceeds that of polyurethanes and of epoxy resins.

It is also possible to use acrylic systems, i.e. reaction products produced via free-radical polymerization of mono- or polyfunctional monomeric or oligomeric derivatives of acrylic or methacrylic acid. In particular mention may be made here of the esters of acrylic and of methacrylic acid. The polymerization reaction can be induced via mixing to incorporate reaction initiators into the starting mixture, for example free-radical initiators based on peroxide or the like. The hardening or crosslinking can also be induced via high-energy radiation, for example UV light or electron beams. The term acrylic systems also, of course, includes copolymers of (meth)acrylic acid and of its derivatives.

Experience has shown that epoxy resin systems can also be used, i.e. reaction products composed of relatively high-molecular-weight compounds having at least two reactive epoxy groups and of polyfunctional polyamines, polyaminoamides or a mixture of these substances, to which reaction accelerators known from epoxide chemistry can be added. The polyamines here assume the function of the hardener component.

It is also possible to use systems based on unsaturated polyesters, i.e. reaction products from free-radical polymerization of unsaturated polyesters. These unsaturated polyesters are the product of reaction of polyhydric alcohols with mono- or polyunsaturated polybasic carboxylic acids. These unsaturated polyesters can be dissolved in monomers capable of free-radical polymerization, such as styrene or divinylbenzene, or else in diallyl phthalate and monomeric derivatives of acrylic acid or of methacrylic acid, e.g. esters, such as methyl acrylate or methyl methacrylate. The polymerization is initiated via admixture of suitable reaction initiators to the resin mixture and/or via introduction of energy (heat) or of high-energy radiation (UV light or electron beams).

All of these systems can comprise conventional additives, such as fillers, fibres, dyes, stabilizers, viscosity regulators and the like. They can moreover have been modified via addition of blowing agents in such a way as to form, during the setting reaction, an entirely or to some extent cellular structure, in order to fill cavities extending to the outer side of the pipeline. It can in particular be extremely advantageous to add materials which increase the durability and strength of the plastics filling, for example mineral fillers and/or reinforcing fibres.

Fillers that can be used are in particular those of mineral type, for example quartz sand, electrostatic-filter ash and the like. The mineral additives can make up from 2 to 95% by weight of the plastics material, in particular from 50 to 90% by weight. A mixture composed of 1 part of epoxy resin and 5 parts of quartz sand has proved to be particularly suitable, a conventional blowing agent being used as admixture to the epoxy resin to form a fine-pore closed-cell foam whose density is in the range from 0.8 to 2.0 $g/cm^3$, depending on the filler level.

In addition to mineral fillers or as an alternative thereto, fibres can be present in the plastics material, their amount being that required to increase strength. Examples of suitable fibres are polypropylene staple fibres, steel fibres or mineral fibres, e.g. glass wool or rock fibre. Proportions of from 0.5 to 5% by weight of fibre in the plastics material are generally completely sufficient.

The plastics materials and hardeners used are, of course, known per se.

The filler material can be pressed into, or sucked into, the annular space. It is advantageous to use a combination of these measures, by injecting the material at one end of the line while subatmospheric pressure is applied at the other end. The inliner should be subjected to pressure here, so that it does not collapse.

To the extent that a hardener is immediately admixed with the plastics material applied to the wall of the line, hardening takes place over the period typical of the material, without use of any further external effect. If the hardening of the plastic material takes place via radiation or supply of heat, it is necessary that, after application of the plastics material, the layer is treated with radiation or with heat, and this can take place through the inliner.

In another possible embodiment, the external diameter of the pipe-liner can also be somewhat larger than that of the pipe to be lined. For introduction of the inliner, its cross section is then reduced via stretching, compression or folding. Once the inliner has been introduced, its resilience brings it into contact with the inner wall of the pipe. Pressure and heat can be applied to promote this procedure. The pipe thus lined has no annular space. Swagelining™ may be mentioned as an example of a method known to a person skilled in the art. Using this method, the inliner can also be introduced before the product leaves the factory.

In another possible embodiment of the invention, an inner pipe according to the claims is introduced into a section to be renovated in a pipe or in a sewer, and is folded for introduction, and is then placed with its spacers associated with the outer wall in contact with the wall of the pipe or of the sewer, whereupon the intermediate space between the wall of the pipe or of the sewer and the outer wall of the inner pipe is filled, the method here being that the inner pipe, which is intrinsically stable in the condition in which it is used, gives what amounts to a recessed conveyor belt, and is folded prior to or during introduction into the section of pipe or of sewer, and the resultant conveying space or the resultant recess is filled with a filler material which hardens after a delay, and the inner pipe here is assisted in regaining its shape, once it has reached its final position, by filling of its interior space with a fluid.

This type of process therefore makes it possible for the first time to introduce the actual renovating inner pipe simultaneously with the filler material required, i.e. with the plastic, into the pipe section to be renovated, and to introduce the filler material at the respective usage site provided there, into the intermediate space which is formed, and in this process also simultaneously and concomitantly to fill cavities in the ground. Within the recess of the conveyor belt composed of the folded inner pipe it is possible to introduce an adequate amount of this filler material, and when the shape of the inner pipe is restored this then brings about uniform distribution of the filler material over the entire periphery.

The invention can achieve very long lasting renovation or, respectively, sealing of a pipeline.

The inventive production of an inliner will be illustrated by way of example below. The following materials were used in the trials:

Amine-regulated PA12 having 50 meq/kg of $NH_2$ groups and 9 meq/kg of COOH groups, $\eta_{rel}$ about 2.15. Contains 54.5 ppm phosphorus as a result of the production process.

Acid-regulated PA12 having 8 meq/kg of $NH_2$ groups and 50 meq/kg of COOH groups, $\eta_{rel}$ about 2.15. Contains 54.5 ppm phosphorus as a result of the production process.

Brüggolen® M1251, a mixture composed of a low-viscosity polycarbonate and of an acid-terminated PA6.

Ceasit® PC (calcium stearate).

The compounded materials given in Table 1 were produced in a Werner & Pfleiderer ZSK 30 twin-screw extruder.

COMPARATIVE EXAMPLES A AND B, AND INVENTIVE EXAMPLE 1

The starting materials stated in Table 2 were processed by starting from pellets or from a pellet mixture, in a 50 series Reifenhäuser single-screw extruder with three-zone screw (L=25 D), and extruded to give a liner whose wall thickness was 2.9 mm and whose external diameter was 32 mm. Comparison of Comparative Example B with Inventive Example 1 reveals that according to the invention, despite greater melt pressure, the load required on the motor was markedly lower for production of a pipe composed of a very high-molecular-weight polyamide.

COMPARATIVE EXAMPLES C AND D, AND INVENTIVE EXAMPLE 2

The starting materials stated in Table 3 were processed by starting from pellets or from a pellet mixture, in a 90 series Reifenhäuser single-screw extruder with three-zone screw (L=30 D), and extruded to give a liner whose wall thickness was 15.3 mm and whose external diameter was 168.3 mm. Comparison of Comparative Example D with Inventive Example 2 reveals that according to the invention, despite greater melt pressure, the load required on the motor was markedly lower for production of a pipe composed of a very high-molecular-weight polyamide.

COMPARATIVE EXAMPLES E AND F, AND INVENTIVE EXAMPLE 3

The starting materials stated in Table 4 were processed by starting from pellets or from a pellet mixture, in a 60 series Cincinnati single-screw extruder with three-zone screw (L=30 D), and extruded to give a liner whose wall thickness was 2.0 mm and whose external diameter was 285 mm. Comparison of Comparative Example F with Inventive Example 3 reveals that according to the invention, despite greater melt pressure, the load required on the motor was markedly lower for production of a pipe composed of a very high-molecular-weight polyamide.

On direct use of compounded material B, $\eta_{rel}$ (as measure of molecular weight) decreases from 2.55 initially to from 2.30 to 2.34 (Comparative Examples B, D and F) by chain degradation with shear. No such chain degradation is found in the inventive method (Inventive Examples 1 to 3).

In Comparative Examples C and E, it was possible to produce the liners only under very difficult conditions. Inter alia, it was necessary to select minimum melt temperature and a die temperature in the region of the melting point of the PA12. In addition, wall thickness distribution was unsatisfactory. The selected processing parameters gave no further tolerance, in contrast to Inventive Examples 1 to 3.

TABLE 1

Production of compounded materials

|  | Compounded material A | Compounded material B | Master batch 1 | Master batch 2 |
|---|---|---|---|---|
| Amine-regulated PA12 [% by wt.] | 60 | 99.3 | 99.9 | 0 |
| Acid-regulated PA12 [% by wt.] | 40 | 0 | 0 | 98.4 |
| Brüggolen M1251 [% by wt.] | 0 | 0.6 | 0 | 1.5 |
| Ceasit PC [% by wt.] | 0 | 0.1 | 0.1 | 0.1 |
| Throughput [kg/h] | 10 | 10 | 10 | 10 |
| Screw rotation rate [l/min] | 250 | 250 | 250 | 250 |
| Melt temperature [° C.] | 251 | 259 | 249 | 251 |
| Melt pressure [bar] | 33 | 62 | 35 | 34 |
| Power consumption of motor [%] | 73 | 96 | 78 | 72 |
| $\eta_{rel}$ to DIN EN ISO 307 | 2.11 | 2.55 | 2.10 | 2.12 |

TABLE 2

Processing to give 32 × 3 mm inliners

|  | Comparative Example A | Comparative Example B | Inventive Example 1 |
|---|---|---|---|
| Compounded material A [% by wt.] | 100 | 0 | 0 |
| Compounded material B [% by wt.] | 0 | 100 | 0 |
| Masterbatch 1 [% by wt.] | 0 | 0 | 60 |
| Masterbatch 2 [% by wt.] | 0 | 0 | 40 |
| Screw rotation rate [l/min] | 37 | 37 | 37 |
| Take-off speed [m/min] | 2.3 | 2.3 | 2.3 |
| Die temperature [° C.] | 220 | 245 | 245 |
| Melt temperature [° C.] | 232 | 255 | 247 |
| Melt pressure [bar] | 58 | 97 | 119 |
| Power consumption of motor [%] | 64 | 94 | 70 |
| $\eta_{rel}$ to DIN EN ISO 307 | 2.08 | 2.30 | 2.51 |

TABLE 3

Processing to give 168.3 × 15.3 mm inliners

|  | Comparative Example C | Comparative Example D | Inventive Example 2 |
|---|---|---|---|
| Compounded material A [% by wt.] | 100 | 0 | 0 |
| Compounded material B [% by wt.] | 0 | 100 | 0 |
| Masterbatch 1 [% by wt.] | 0 | 0 | 60 |
| Masterbatch 2 [% by wt.] | 0 | 0 | 40 |
| Screw rotation rate [l/min] | 52 | 66 | 66 |
| Take-off speed [m/min] | 0.5 | 0.8 | 0.8 |
| Die temperature [° C.] | 180 | 245 | 245 |
| Melt temperature [° C.] | 220 | 260 | 254 |
| Melt pressure [bar] | 72 | 130 | 151 |
| Power consumption of motor [%] | 37 | 98 | 77 |
| $\eta_{rel}$ to DIN EN ISO 307 | 2.07 | 2.34 | 2.54 |

TABLE 4

Processing to give 285.0 × 2.0 mm inliners

|  | Comparative Example E | Comparative Example F | Inventive Example 3 |
|---|---|---|---|
| Compounded material A [% by wt.] | 100 | 0 | 0 |
| Compounded material B [% by wt.] | 0 | 100 | 0 |
| Masterbatch 1 [% by wt.] | 0 | 0 | 60 |
| Masterbatch 2 [% by wt.] | 0 | 0 | 40 |
| Screw rotation rate [l/min] | 25 | 44 | 44 |
| Take-off speed [m/min] | 0.8 | 1.7 | 1.7 |
| Die temperature [° C.] | 175 | 245 | 245 |
| Melt temperature [° C.] | 224 | 256 | 247 |
| Melt pressure [bar] | 72 | 87 | 103 |
| Power consumption of motor [%] | 66 | 56 | 40 |
| $\eta_{rel}$ to DIN EM ISO 307 | 2.01 | 2.31 | 2.53 |

The invention claimed is:

1. A method for sealing a pipeline, comprising introducing inside of a pipe, an inner pipe having first and second open ends, said inner pipe comprising a polyamide moulding composition whose molecular weight has been increased by condensation, via the addition of a compound having at least two carbonate units in a quantitative proportion of from 0.005 to 10% by weight, based on polyamide prepared by a process comprising a) mixing a starting polyamide moulding composition and said compound having at least two carbonate units forming a premix, b) optionally, storing and/or transporting said premix, and c) processing said premix to give a moulding, wherein an increase of molecular weight by condensation occurs for the first time, said moulding being a pipe or hose whose external diameter is at least 25 mm.

2. The method according to claim 1, wherein the external diameter of said moulding is at least 60 mm.

3. The method according to claim 1, wherein the external diameter of said moulding is at least 110 mm.

4. The method according to claim 1, wherein, said polyamide is prepared using a diamine or polyamine as a regulator.

5. The method according to claim 1, wherein said compound having at least two carbonate units is used in the form of a masterbatch.

6. The method according to claim 1, wherein said pipe transports at least one of district heating, fresh water, waste water, gas, oils, fuels, petrochemicals, brine, lyes, abrasive fluids and dusts.

7. The method according to claim 1, wherein said inner pipe is hardened after introduction inside of said pipe.

8. The method according to claim 1, wherein said inner pipe has an external diameter which is larger than an inner diameter of said pipe.

9. The method according to claim 1, wherein said inner pipe is brought into contact with an inner wall of said pipe, after having been introduced inside of said pipe.

10. The method according to claim 1, wherein said inner pipe is uniformly distributed over the inner periphery of said pipe.

* * * * *